United States Patent [19]
Hayashi

[11] Patent Number: 5,931,413
[45] Date of Patent: Aug. 3, 1999

[54] AIRCRAFT

[76] Inventor: Masahiko Hayashi, 12-22, Tsurumaki 3-chome, Setagaya-ku, Tokyo, Japan

[21] Appl. No.: 08/969,022

[22] Filed: Nov. 12, 1997

[51] Int. Cl.[6] ........................................... B64B 1/02
[52] U.S. Cl. .................. 244/32; 244/96; 244/99
[58] Field of Search .................. 244/25, 30, 31, 244/32, 145, 146, 152, 96, 98, 99

[56] References Cited

U.S. PATENT DOCUMENTS

| | | | |
|---|---|---|---|
| 582,377 | 5/1897 | Sly | 244/32 |
| 3,110,457 | 11/1963 | Struble, Jr. | 244/31 |
| 3,120,932 | 2/1964 | Stahmer | 244/31 |
| 3,128,969 | 4/1964 | Yost | 244/31 |
| 3,432,122 | 3/1969 | Flickinger et al. | 244/31 |
| 3,508,725 | 4/1970 | Nebiker | 244/32 |
| 4,084,771 | 4/1978 | Creuzet | 244/31 |

Primary Examiner—Galen L. Barefoot
Attorney, Agent, or Firm—Jordan and Hamburg

[57] ABSTRACT

An aircraft of the present invention has an envelope used in such an air balloon and/or airship. The aircraft can be inflated continuously to the envelope with supplying an air into the envelope without extending the envelope on the ground, and the envelope can be rolled up continuously into the gondola with an inside-out condition, as keeping the inflating condition of the envelope.

13 Claims, 18 Drawing Sheets

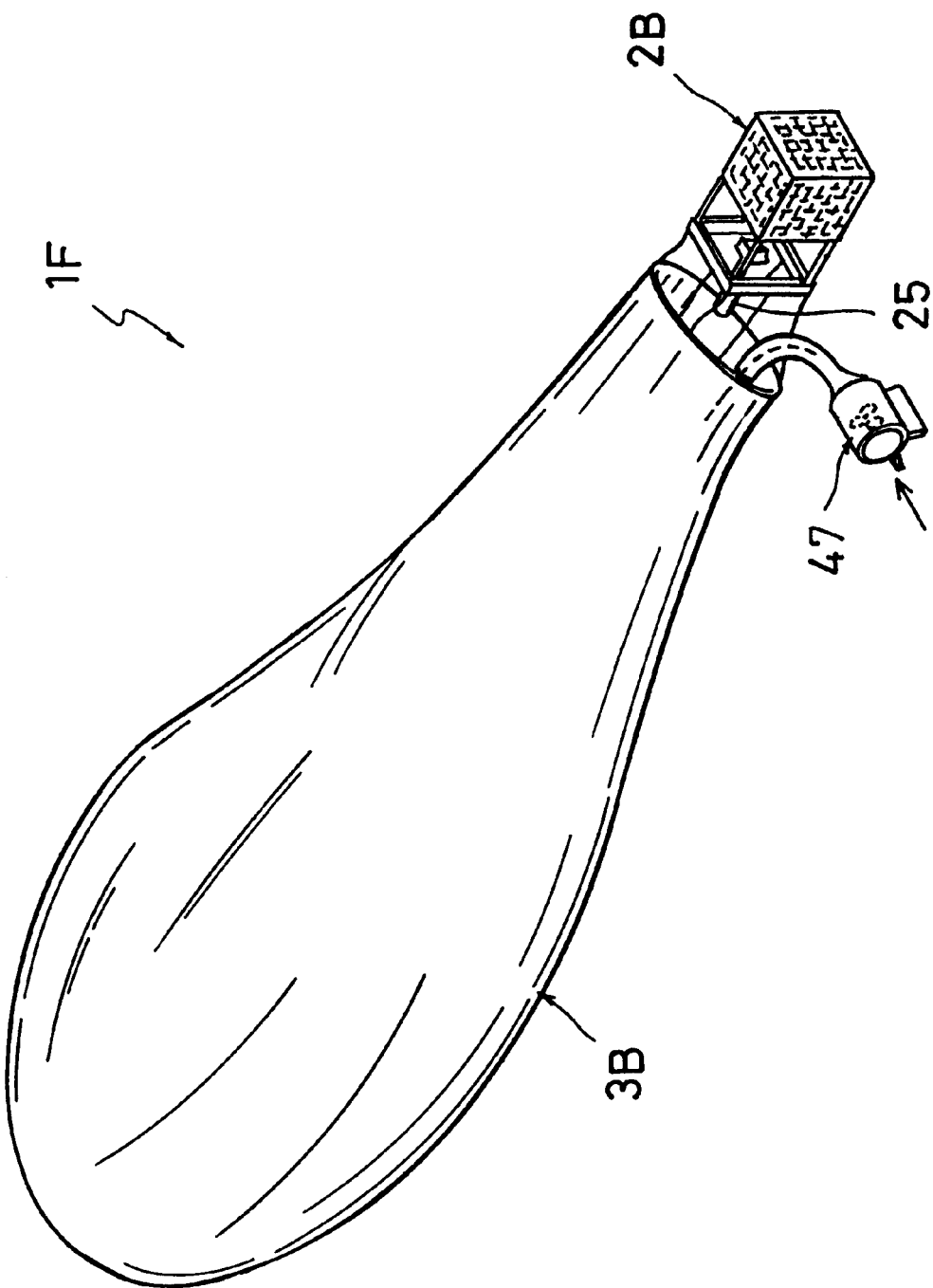

AIRCRAFT

BACKGROUND OF THE INVENTION

The present invention to aircraft and provides an envelope which is foldable during nonuse for an air balloon and airship.

A conventional envelope of the airship was extended on the ground, sent a hot air into the envelope by using a burner and inflated to the envelope during use, and can be folded during a time of nonuse by a hand and could be put away.

The conventional envelope requires a lot of time and effort to take out of the envelope from the gondola or envelope storage bag, extend it on the ground, and inflate and fold to the envelope. Moreover, the folded envelope have to be storaged into the gondola or envelope storage bag.

SUMMARY OF THE INVENTION

It is an object of the present invention to provide an aircraft which can be inflated continuouslly to the envelope with supplying an air into the envelope without extending on the ground.

It is another object of the present invention to provide an aircraft which can be storaged and rolled up continuously into the gondola with inflating condition of the envelope.

The prescribed and other objects and features of the present invention will be understood by reading carefully the following description in conjunction with the accompanying drawings.

The drawings are illustrative and are not limiting to the scope of the present invention.

BRIEF DESCRIPTION OF THE DRAWING

FIG. 29 is an explanation view of an envelope with the inflating condition showing a seventh embodiment of the present invention.

DESCRIPTION OF THE PREFERRED EMBODIMENT

Preferred embodiments of the present invention will be described in more detail referring to the accompanying drawings.

FIGS. 1 to 11 illustrate an aircraft 1 of a first embodiment of the present invention. The aircraft 1 is formed in the UFO-shaped air-ship and comprises a gondola 2 capable of carrying customers, an envelope 3 mounted to the gondola 2, storageble so as to roll up with an inside-out condition during a time of nonuse, means for inflating 4 the envelope 3 installed to the gondola 2, inflatable to the envelope 3, and means for rolling up 5 the envelope 3 installed to the gondola 2, rollable up the envelope 3 in order with discharging a hot air with the inside-out condition of the envelope 3.

Figure 1:
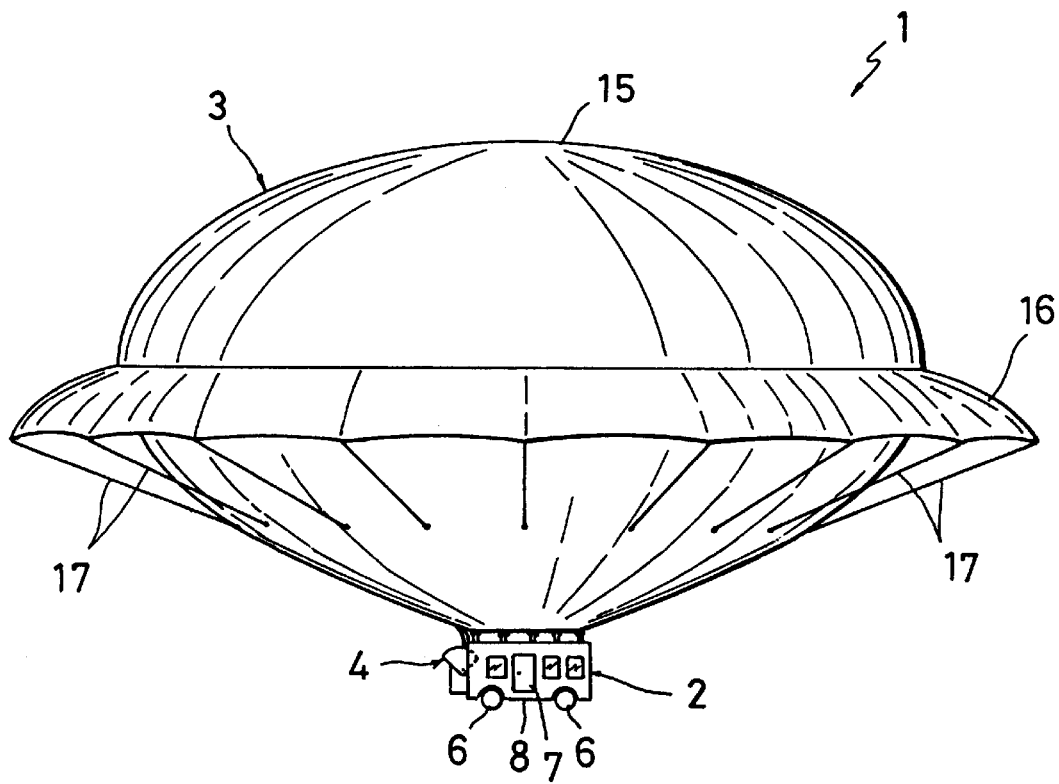
FIG. 1 is a side view showing a first embodiment of the present invention.
Figure 2:
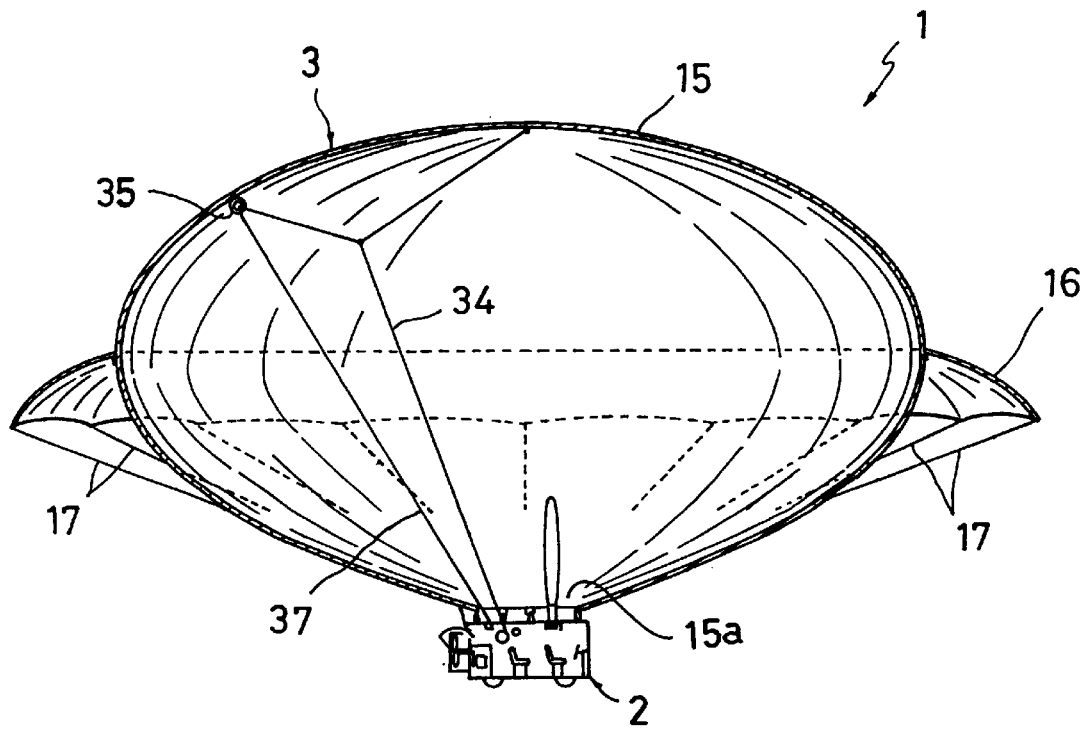
FIG. 2 is a longitudinal sectional view showing a first embodiment of the present invention.
Figure 3:
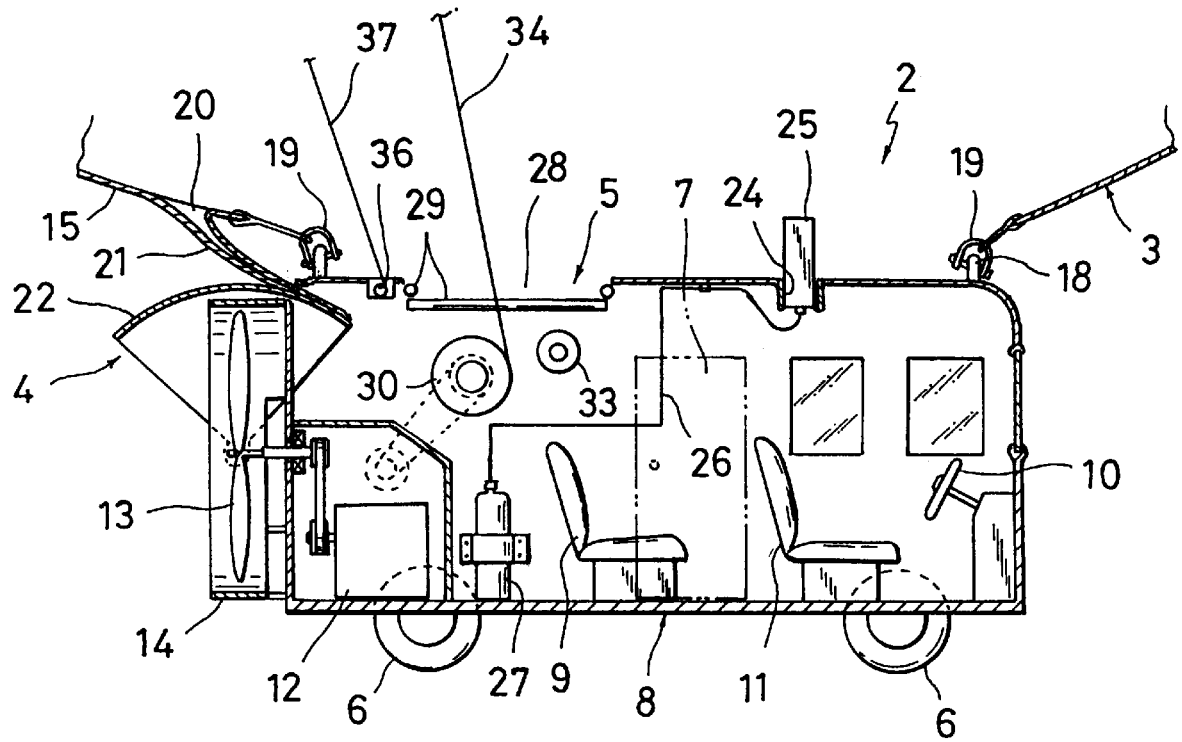
FIG. 3 is a longitudinal sectional view of a part of gondola showing a first embodiment of the present invention.
Figure 4:
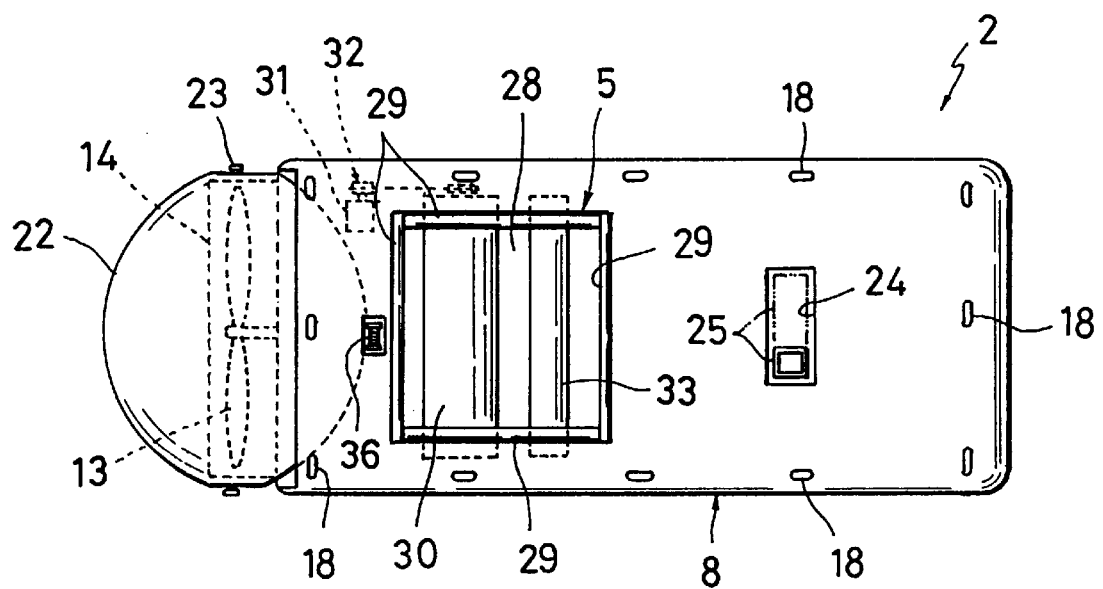
FIG. 4 is a top view of a gondola showing a first embodiment of the present invention.

The gondola 2, as shown in FIGS. 3 and 4, is formed in a shape of a cabin of an airship and comprises a gondola body 8 mounted wheels 6, 6,6,6 thereof, having an open-shut door 7, an operation seat 11 installed into the gondola body 8, operatable with a seat 9 and handle 10, an engine 12 mounted to the gondola body 8, a propeller 13 driven with revolving by the engine 12, and a propeller guard 14 in the cylindrical shape, covering the outer circumferential part of the propeller 13.

Figure 5:
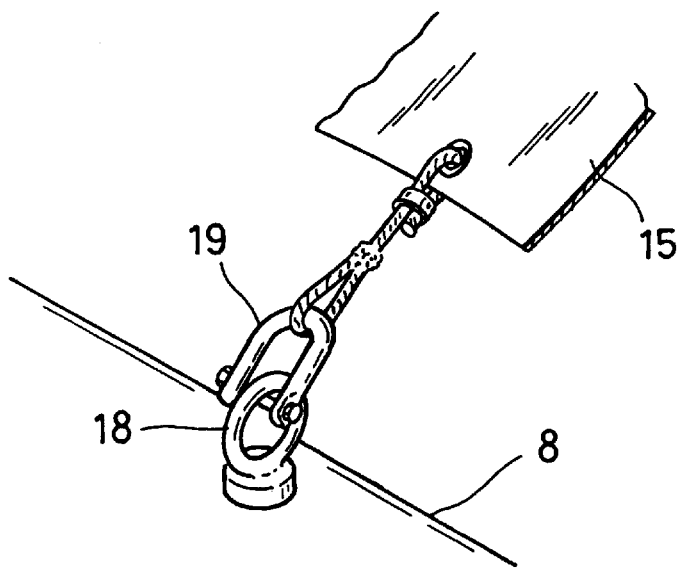
FIG. 5 is an explanation view of a gondola body and envelope body with the attuched condition showing a first embodiment of the present invention.

The envelope 3 comprises an envelope body 15 in the sphrical shape of air balloon that the shape of sphere is almost sphrical but is slightly oblate, a parachute wing 16 fixed with A sewing near center part of outer part of the envelope body 15, a multiplicity of wing holding ropes 17 which are able to be supported the edge of the outer circumferential part of the parachute wing 16 to the envelope body 15 at fixed intervals, and a multiplicity of connection fittings 19, as shown in FIG. 5, provided with the edge part of an opening 15a of the envelope body 15 which is connected to a multiplicity of fitments 18 fixed to an upper part of the gondola body 8.

Figure 7:
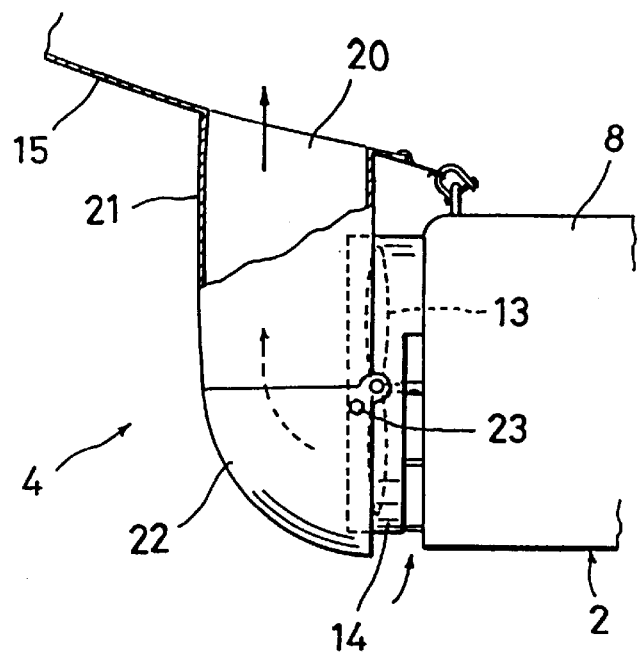
FIG. 7 is an explanation view of a inflating device of envelope with the inflating condition showing a first embodiment of the present invention.
Figure 8:
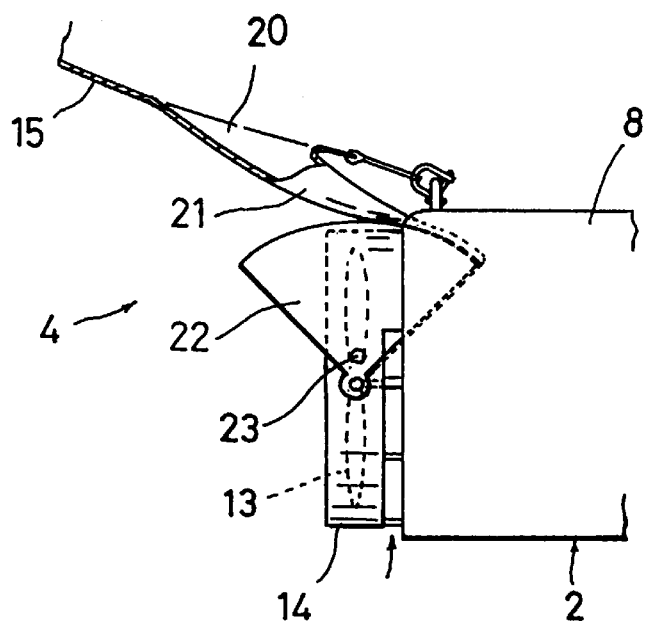
FIG. 8 is an explanation view of a inflating device of envelope with the stopping condition showing a first embodiment of the present invention.

The means for inflating 4 the envelope 3, as shown in FIGS. 7 and 8, comprises a ventilation hole 20 formed near the opening 15a of the envelope body 15 near the propeller guard 14 of te gondola 2, a ventilation tube 21 mounted thereof so as to connect through the ventilation hole 20, an open-shut cover 22 in a contour shape of an one-fourth sphere, a holding device 23 for the open-shut cover 22 holdable the open-shut cover 22 with the closing part of the ventilation tube 21, a burner 25 pivotably storaged in a burner storage part 24 which formed at the upper part of the gondola 2, and a gas-holder 27 supplied a gas into the burner 25 through a hosepipe 26. Additionally, the open-shut cover 22 is pivotted near center part of the propeller guard 14 with the ventilation tube 21, mounted the lower end part of the outer of the ventilation tube 21 to the upper end part of the ropeller guard 14, openably covered to nearly lower half part of the front of the propeller guard 14.

Figure 6:
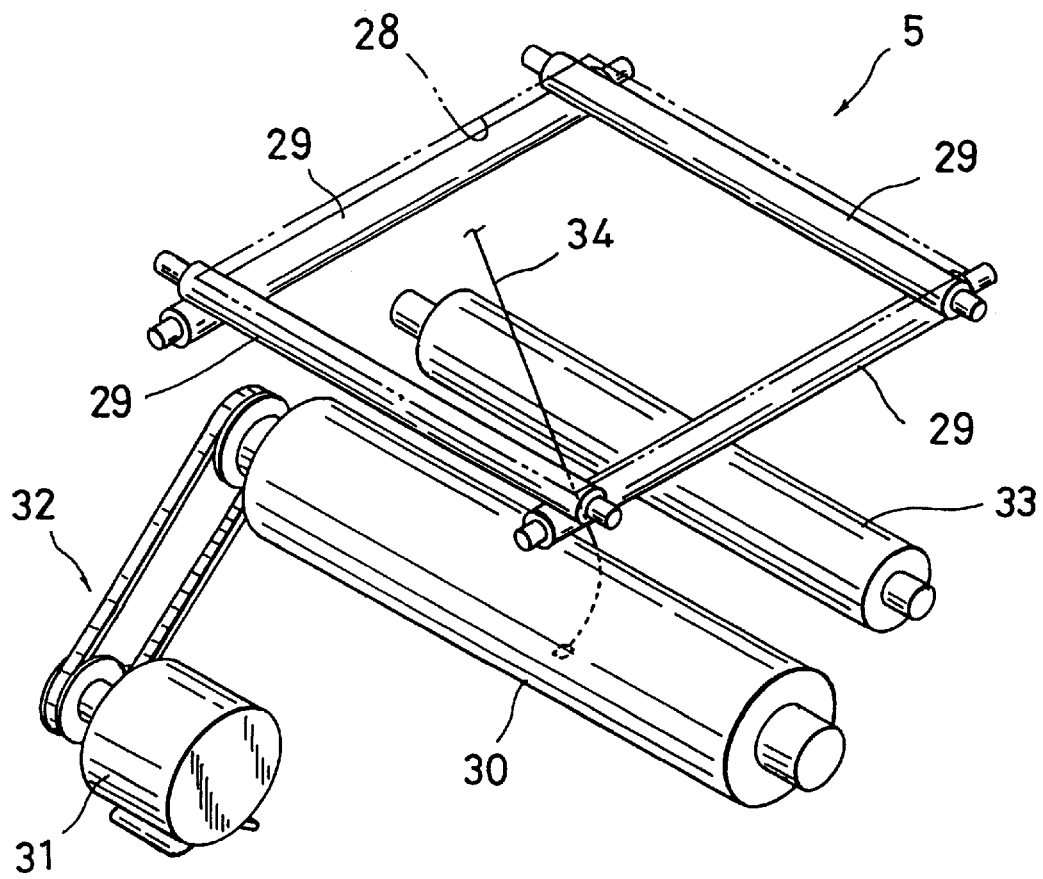
FIG. 6 is an explanation view of a roll-up device of envelope showing a first embodiment of the present invention.

The means for rolling up 5 the envelope 3, as shown in FIG. 6, comprises a square-shaped opening 28 formed to a ceiling part of the gondola 2, guide rollers 29,29,29,29 rotatably mounted to the edge of the each of side of the opening 28, a roll-up drum 30 rotatably installed into the gondola body 8, in corresponding with the lower part ofthe opening 28, is able to roll up the envelope 3 with the inside-out condition, a driving device 32 having a motor 31 turning the roll-up drum 30 clockwise and counterclockwise, a pressure roller 33 presses the envelope 3 rolled up with the roll-up drum 30 and has the air pumped out, a roll-up rope 34 having two ends, the end rolled up with the roll-up drum 30 and the other end mounted to an inner wall near upper part of the envelope 3, and a drawing rope 37 having two ends, the end fixed to the roll-up rope 34 near upper part thereof,the other end fixed to upper side thereof, passes through an O ring 35 and roll up to a reel 36 mounted to the ceiling part of the gondola body 8, so as to be removed the roll-up rope 34 from the fire from the burner 25.

Moreover, the opartion device using the conventional airship is mounted to the aircraft 1 though the matter except for the above-embodied aircraft is not shown in figures.

The aircraft 1 is first pivotted open-shut cover 22 of the means for rolling up 5 the envelope 3 to downward and covered lower part of half of the front part of the propeller guard 14.

When the engine 12 is worked and the propeller 13 starts to rotate, the ventiated air by the propeller 13 is supplied into the envelope 3 through the ventilation tube 21. Then, with rotating with the reverce the roll-up drum 30 of the roll-up device 5, the envelope 3 is sent out in order the same as the quantity of supplied air and is inflated perfectly. During inflating, the temperature of the air inside the envelope 3. As a result, the envelope 3 is made to rise inefficiency.

Moreover, when the gas is burn by the burner 25, the operator can adjust the length of the drawing rope 37 by the reel 36 without touching a fire to the roll-up rope 34.

Secondly, as shown in FIG.8, when the envelope 3 inflates perfectly, the ventilation tube 21 close by that the open-shut cover 22 is pivoted upward and holded by the holding device 23.

Then, the air within the envelope 3 gets warm in order the burning by the burner, and the aircraft 1 is able to fly upward from the ground.

When the air within the envelope 3 gets cool in the sky, the aircraft 1 falls. However, the parachute wing 16 of the envelope 3 extends, and can be slow down to its falling speed.

Figure 9:
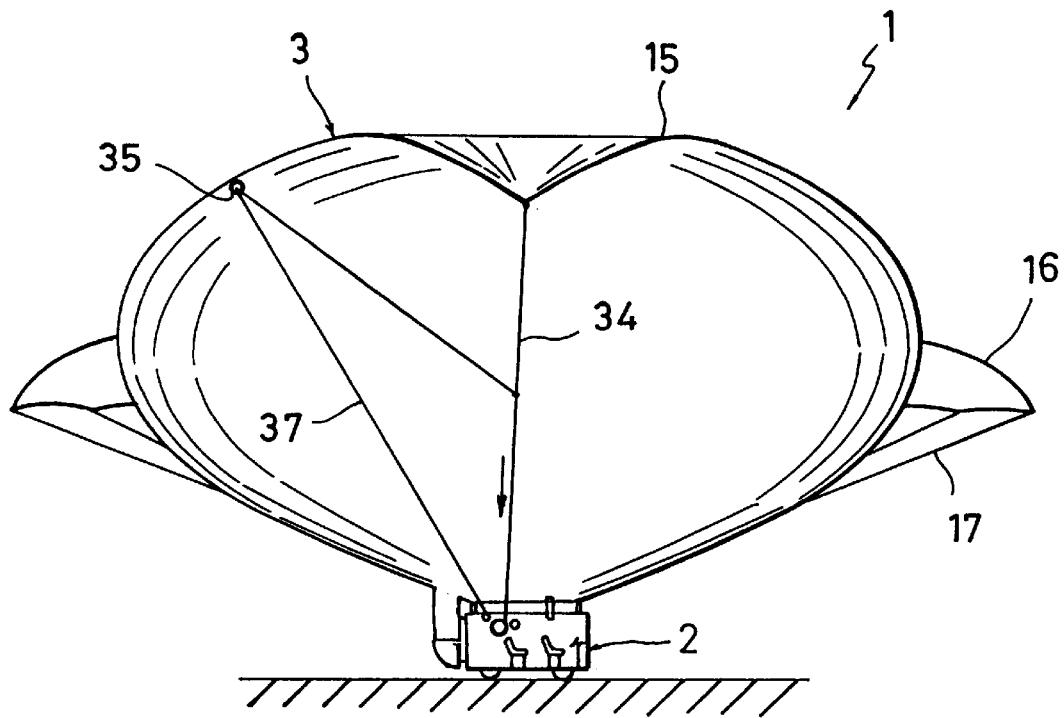
FIG. 9 is an explanation view inflating an envelope at first stage showing a first embodiment of the present invention.
Figure 10:
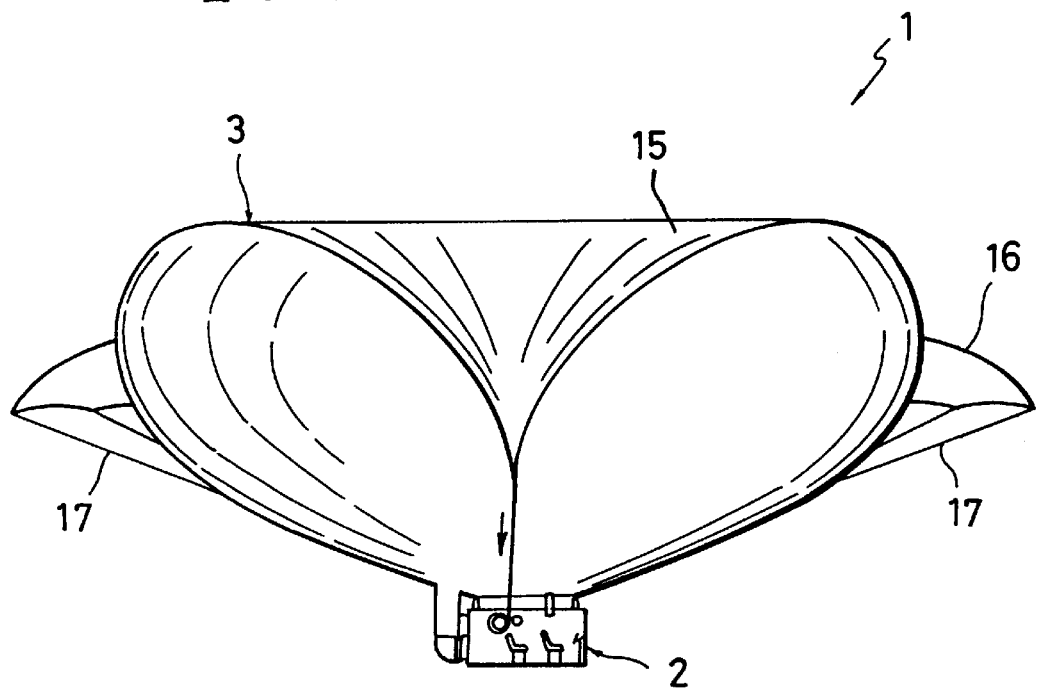
FIG. 10 is an explanation view inflating an envelope at middle stage showing a first embodiment of the present invention.
Figure 11:
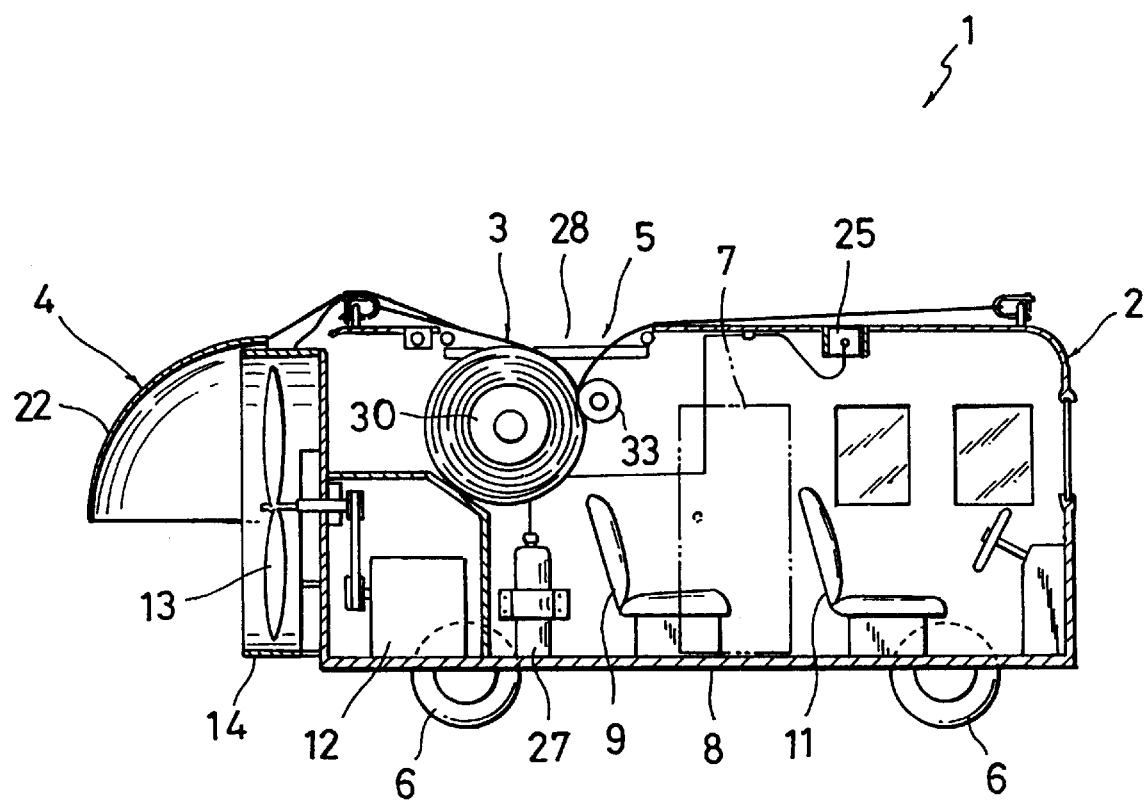
FIG. 11 is an explanation view inflating an envelope showing a first embodiment of the present invention.

When the envelope 3 is storaged, the open-shut cover 22 is set so as to be able to supply the ventilated air by the propeller into the envelope 3 with expanding and rising condition of the envelope 3, and the roll-up drum 30 of the roll-up device 5 is rotated by the driving device 32. Then, the roll-up rope 34 is rolled to the roll-up drum 30 as shown in FIGS. 9 and 10, the part near enter part of the upper part of the envelope 3 is pulled downward, and the envelope 3 is rolled up the roll-up drum 30 in the inside-out condition with sending out the hot air within the envelope 3, and the envelop 3 is rolled up with the roll-up drum 30 perfectly.

In this case, the envelope 3 can keep to rise itself and it is rolled smoothly up to the roll-up drum 30 by the guide rollers 29,29,29, 29.

Other embodiments of the present invention will now be described referring to FIGS. 12 to 29. Through the drawings of the embodiments, like components are denoted by like numerals as of the first embodiment and will not be further explained.

Figure 12:
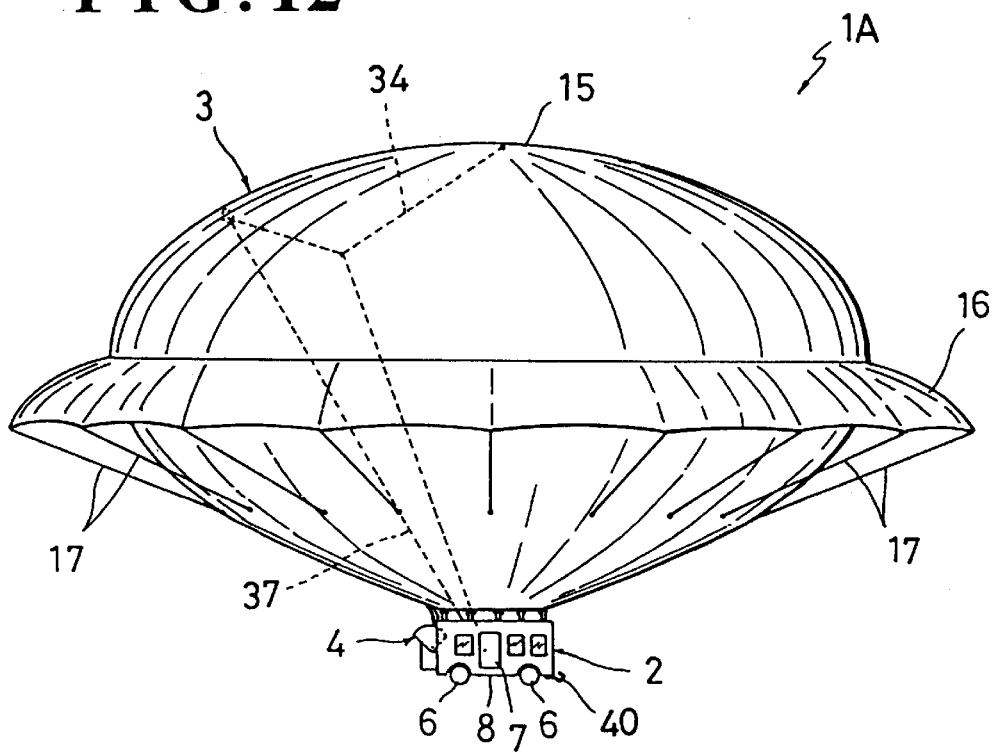
FIG. 12 is a side view showing a second embodiment of the present invention.
Figure 13:
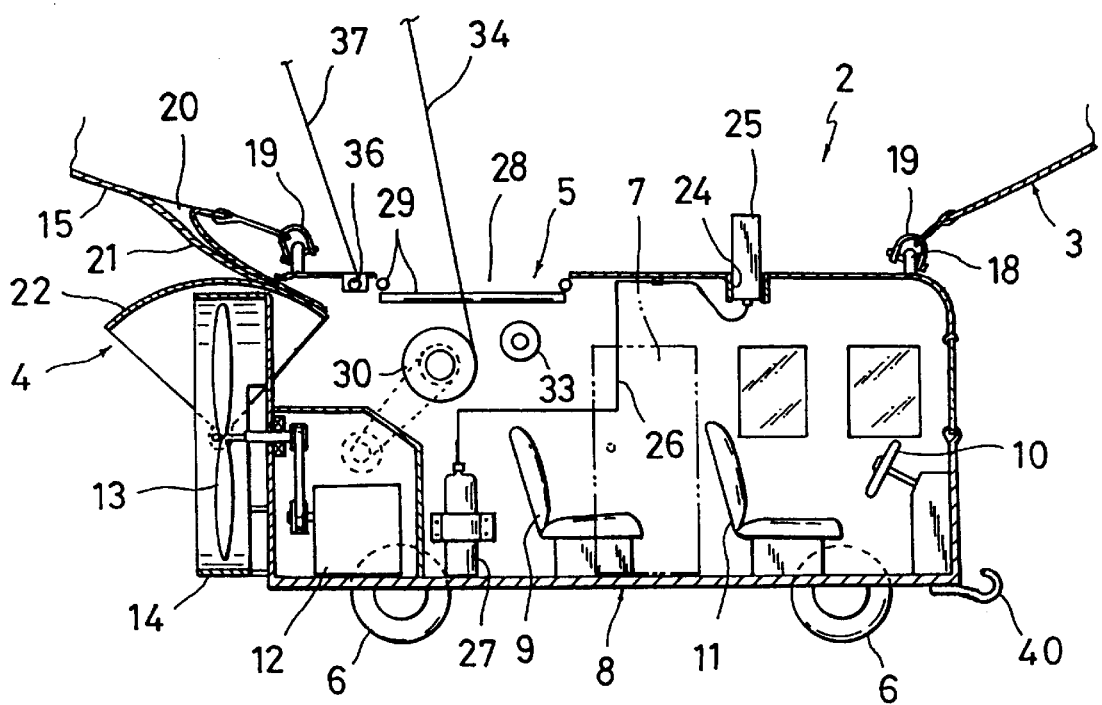
FIG. 13 is a longitudinal sectional view of a part of gondola showing a second embodiment of the present invention.
Figure 14:
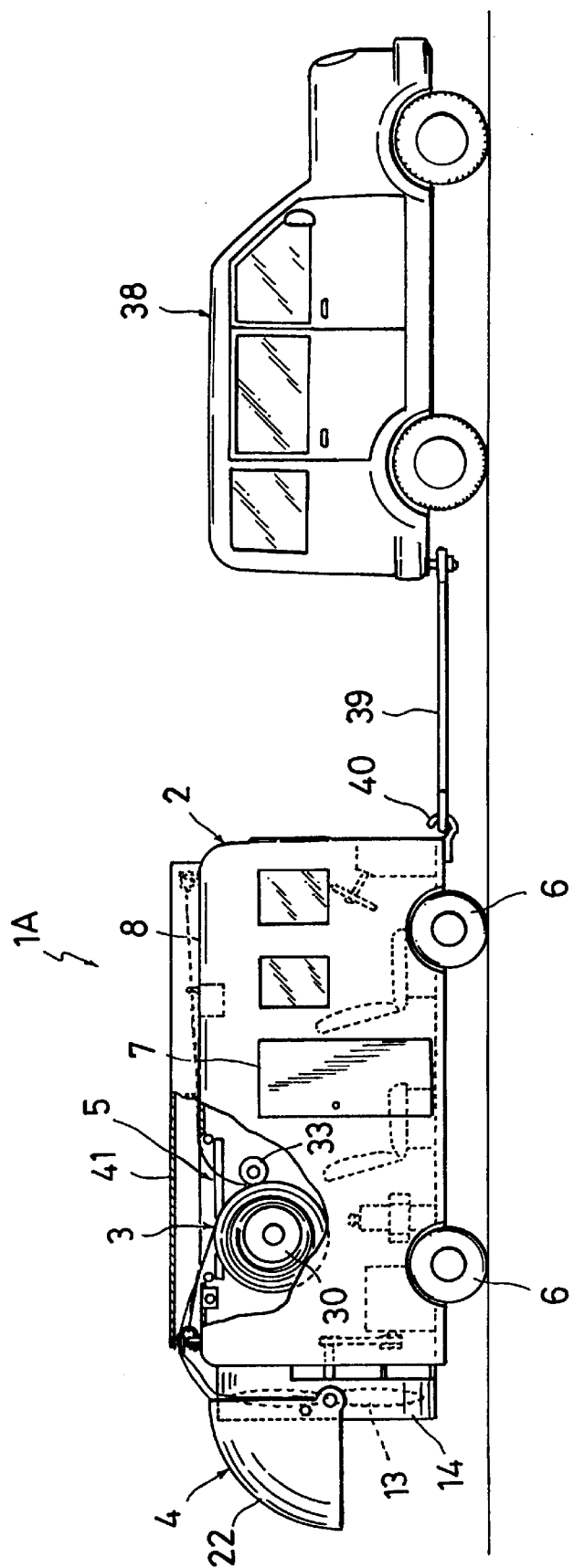
FIG. 14 is an explanation view with the tracting condition showing a second embodiment of the present invention.

FIGS. 12 to 14 show a second embodiment of the present invention which is distinguished from the first embodiment by a fitment 40 of the traction bar 39 capable to mount a traction bar 39 to the gondola body 8 so as to be able to tract by an automobile 38. An aircraft 1A according to second embodiment will provide the same effect as the first embodiment so that the aircraft 1A can be carried by the automobile with a traction.

Moreover, the upper part of the gondola body 8 is mounted a cover 41 capable to mount with the storage condition of the envelope 3 thereto.

Figure 15:
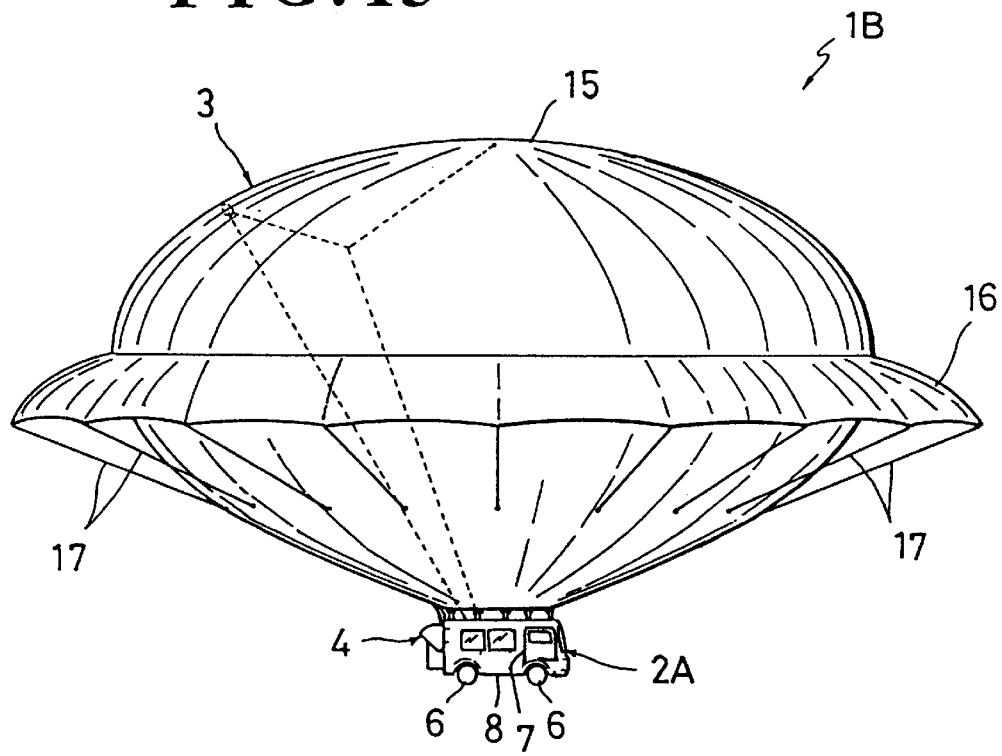
FIG. 15 is a side view showing a third embodiment of the present invention.
Figure 16:
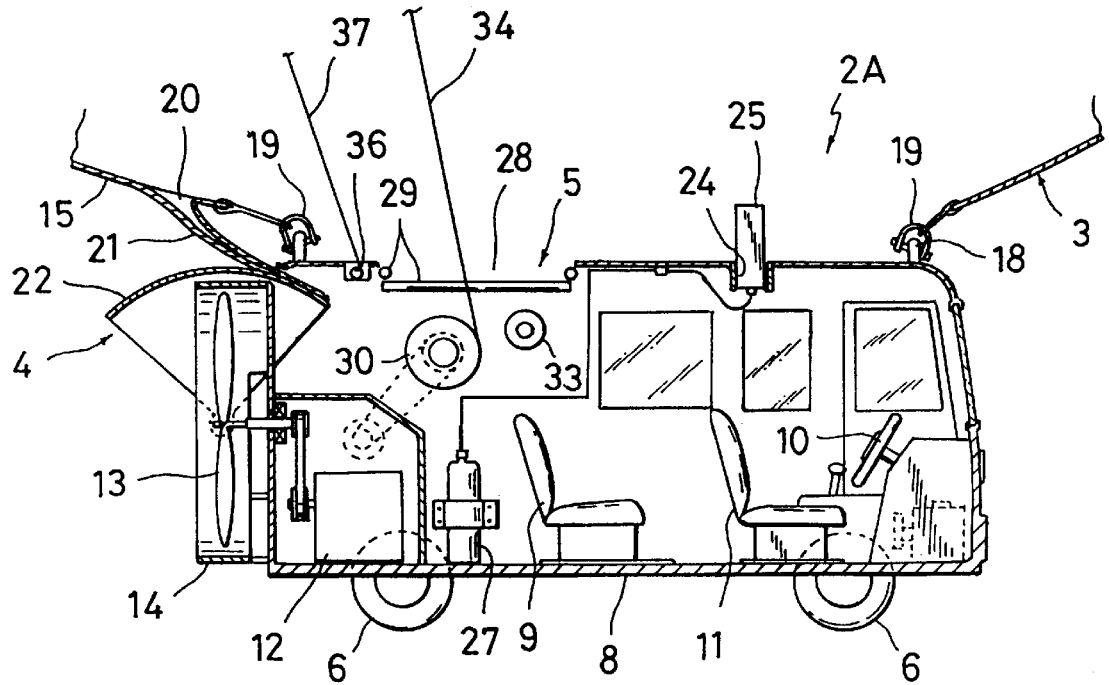
FIG. 16 is a longitudinal sectional view of a part of gondola showing a third embodiment of the present invention.
Figure 17:
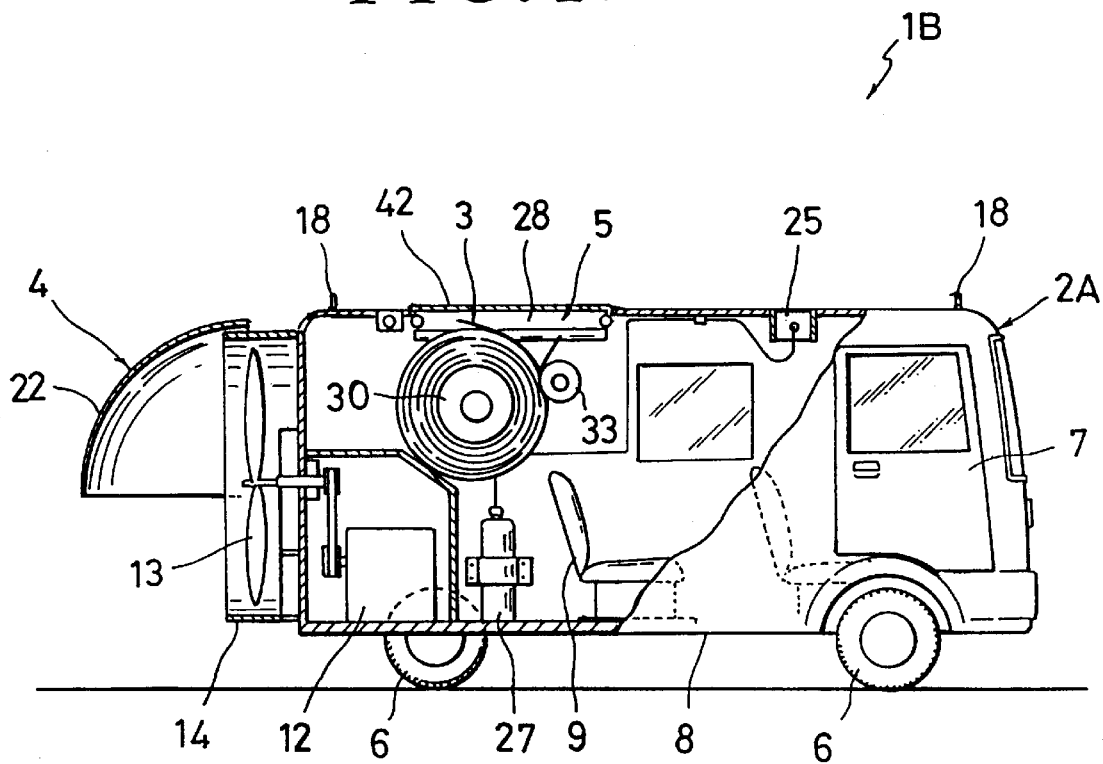
FIG. 17 is an exp lanation view inflating an envelope showing a third embodiment of the present invention.

FIGS. 15 to 17 show a third embodiment of the present invention which is distinguished from the first embodiment by a gondola 2A as a van-typed automobile capable of running itself on the path. An aircraft 1B according to third embodiment will provide the same effects as the first embodiment so that the aircraft 1B an run freely at the path and it is able to remove.

Moreover, the ventilation tube 21 and open-shut cover 22 have a structure movably mounted because the roll-up drum 30 of the gondola body 8 roll up the envelope 3 after removing the multiplicity of connection fittings 19, and an openable closure member 42 is arranged so as to open and shut the opening 28.

Figure 18:
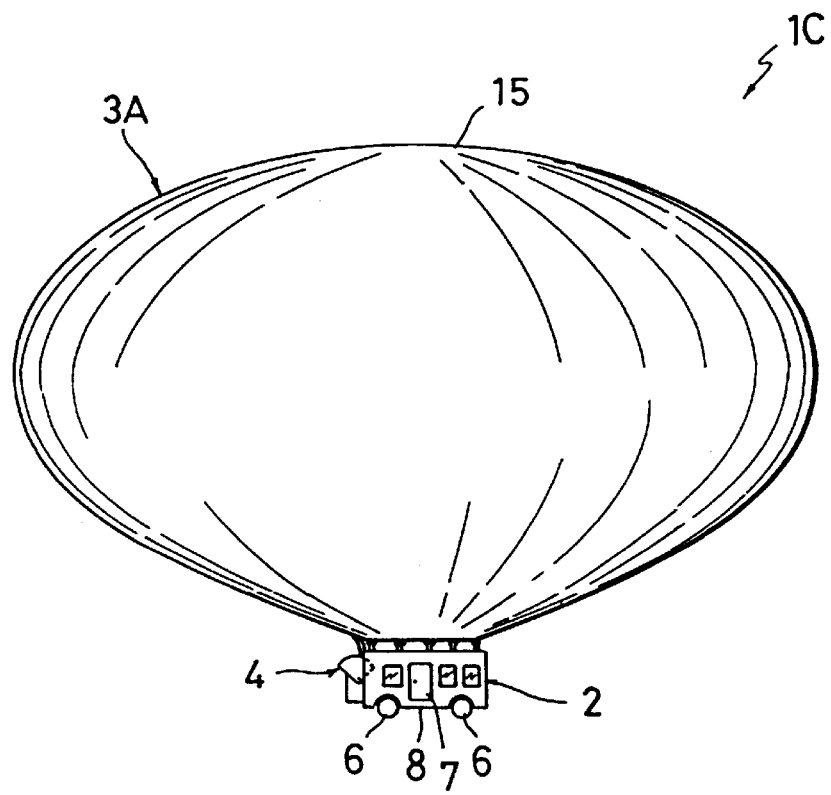
FIG. 18 is a side view showing a third embodiment of the present invention.
Figure 19:
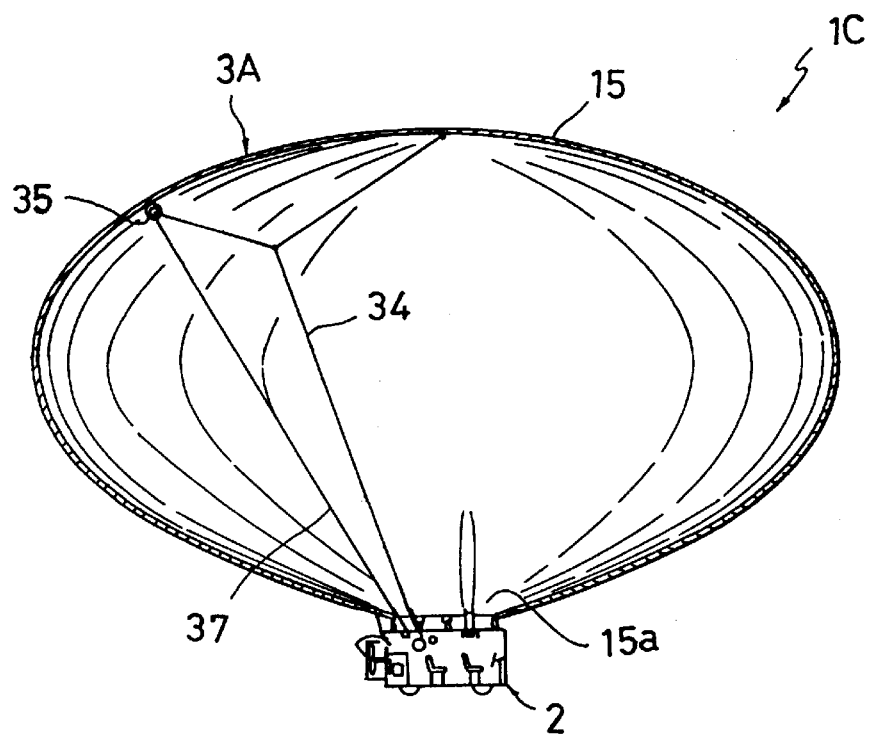
FIG. 19 is a longitudinal sectional view showing a third embodiment of the present invention.
Figure 20:
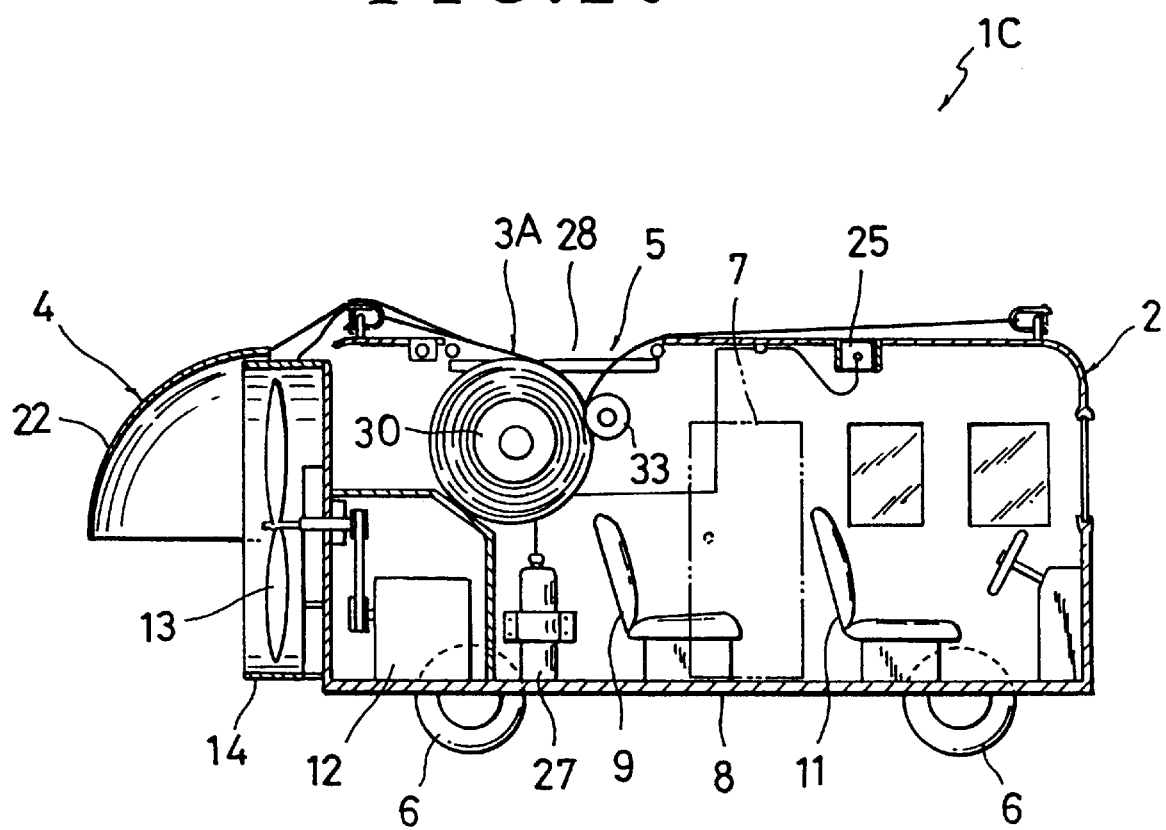
FIG. 20 is an explanation view inflating an envelope showing a fourth embodiment of the present invention.
Figure 21:
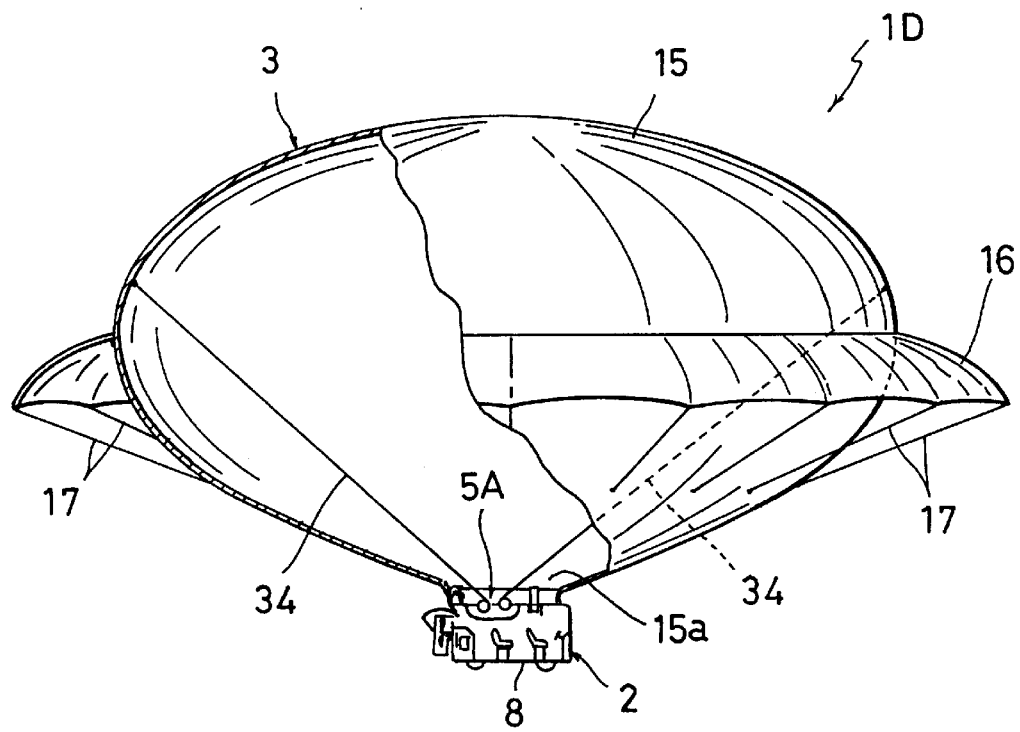
FIG. 21 is an side view, partly in-cross section, showing a fifth embodiment of the present invention.
Figure 22:
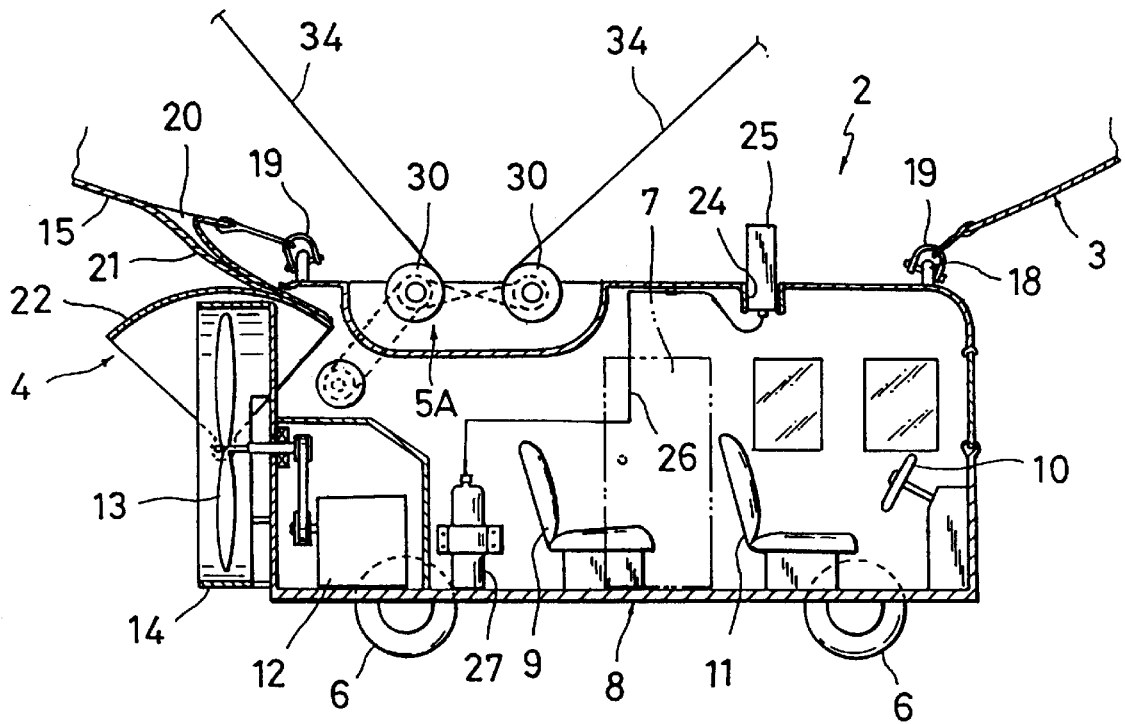
FIG. 22 is a logitudinal sectional view of a part of gondola showing a fifth emboiment of the present invention.
Figure 23:
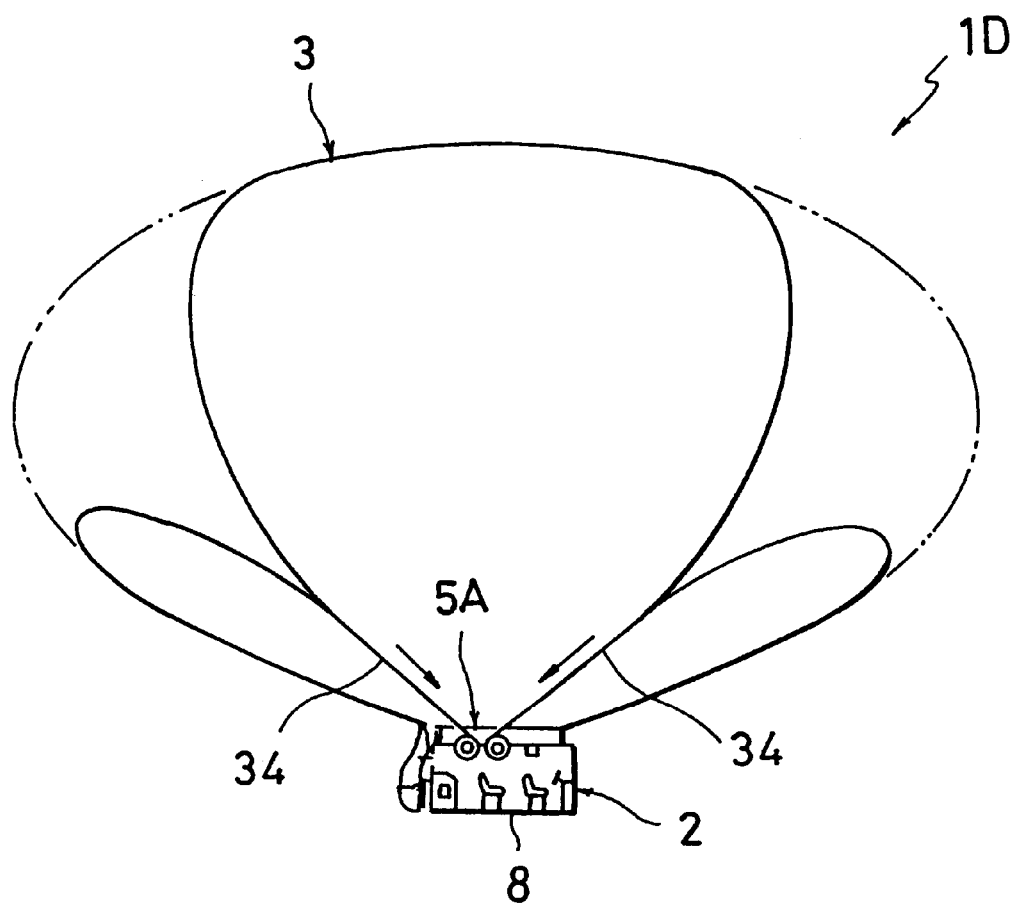
FIG. 23 is an explanation view inflating an envelope showing a fifth embodiment of the present invention.

FIGS. 18 to 20 show a fourth embodiment of the present invention which is distinguished from the first embodiment by an envelope 3A without the parachute wing 16. An aircraft 1C according to fourth embodiment will provide the same effects as the first embodiment FIGS. 21 to 23 show a fifth embodiment of the present invention which is distinguished from the first embodiment by a roll-up device 5A for the envelope 3 which comprises a pair of roll-up drums 30,30 and a pair of roll-up ropes 34,34 installed on the corresponding both sides of the inner wall near center of the envelope 3 rolled up the pair of roll-up drums 30,30. An aircraft 1D with the roll-up device 5A for envelope 3 according to the fifth embodiment will provide the same effects as the first embodiment.

Figure 24:
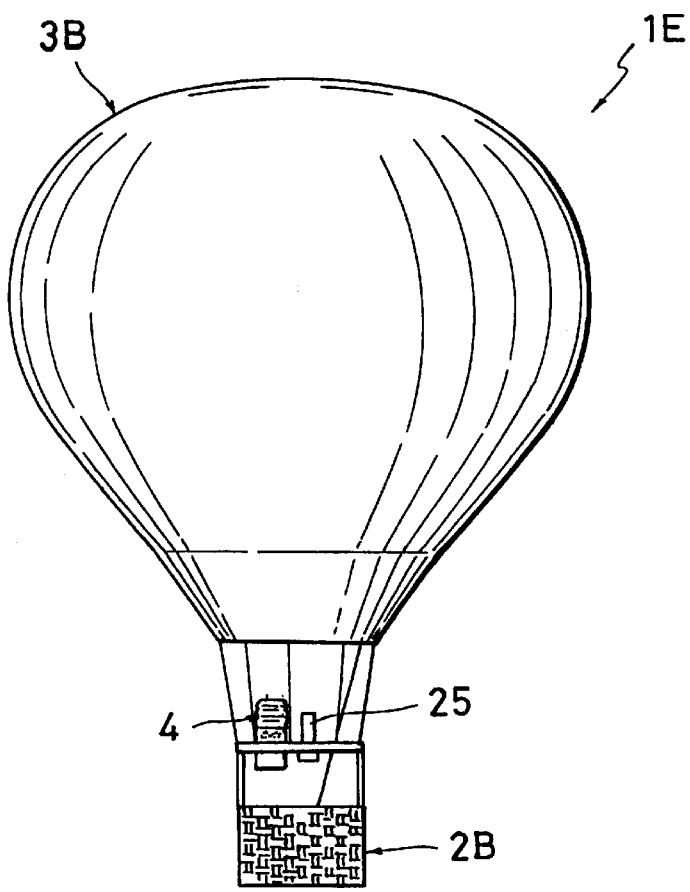
FIG. 24 is a side view showing a sixth embodiment of the present invention.
Figure 25:
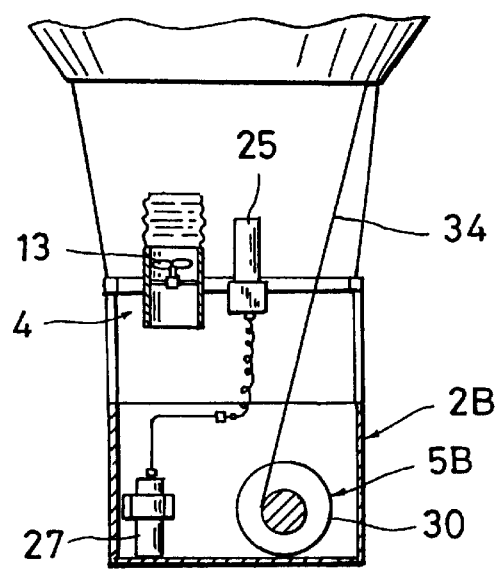
FIG. 25 is a longitudinal sectional view of a part of gondola showing a sixth embodiment of the present invention.
Figure 26:
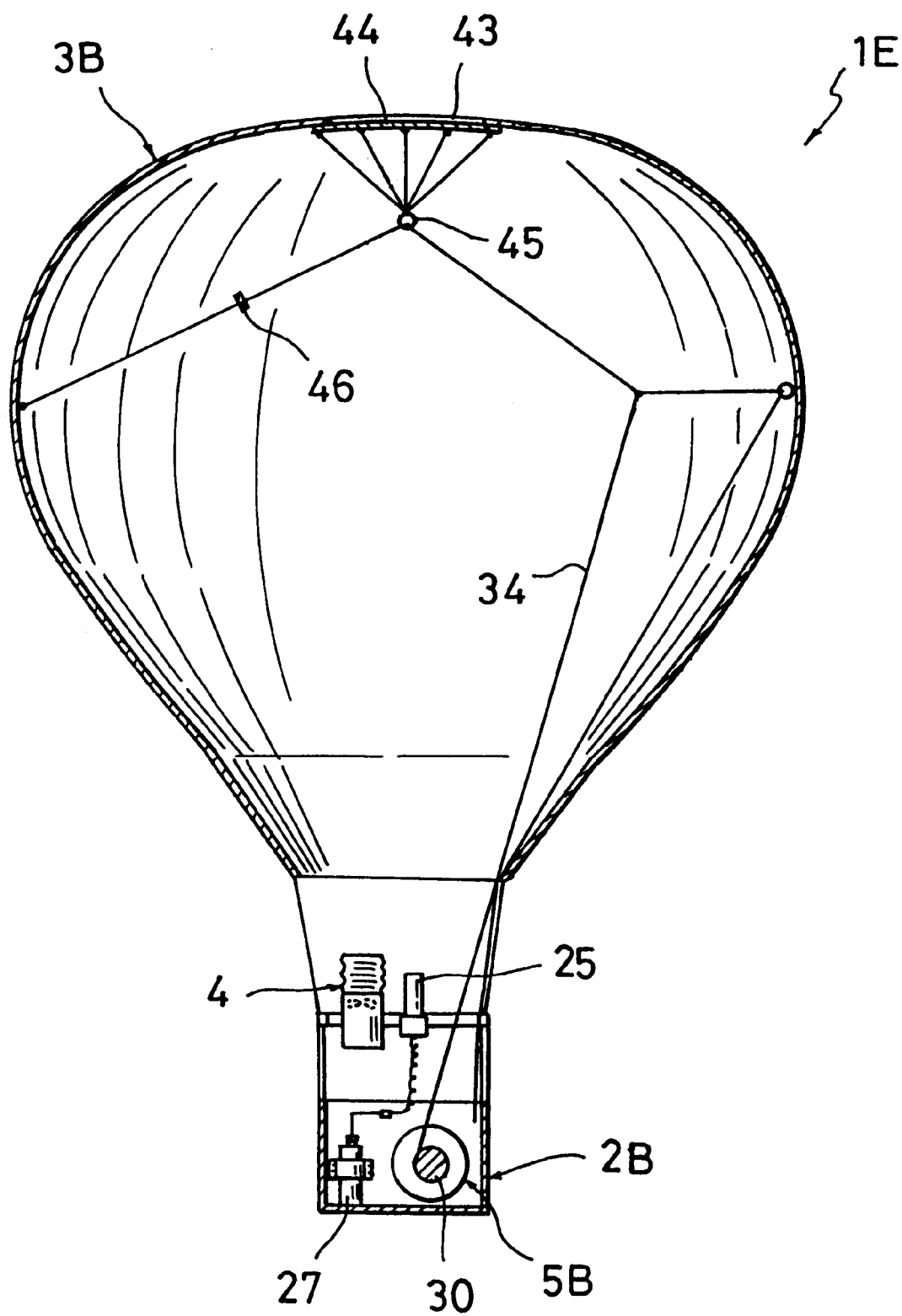
FIG. 26 is a longitudinal sectional view showing a sixth embodiment of the present invention.

FIGS. 24 to 26 show a sixth embodiment of the present invention which is distinguished from the first embodiment by an envelope 3B f formed in the shape of an air balloon, having a parachute valve 44 provided with the upper part thereof which can be open a nd shut a release valve 43, a gondola which is formed in the shape of a box, with open part of an upper part thereof, and a roll-up device 5B for the envelope which comprises a roll-up rope 34 having two ends, the end fixed to near enter of the inner wall of the envelope 3B and the other end rolled up to the roll-up drum 30 through a pulley 45 mounted to the parachute valve 44 and a stopper 46 installed near center part between the end of the roll-up rope 34 and the pulley 45, capable of preventing to pass through the pulley 45. An aircraft 1E according to the sixth embodiment will provide the same effects as the first embodiment.

Figure 27:
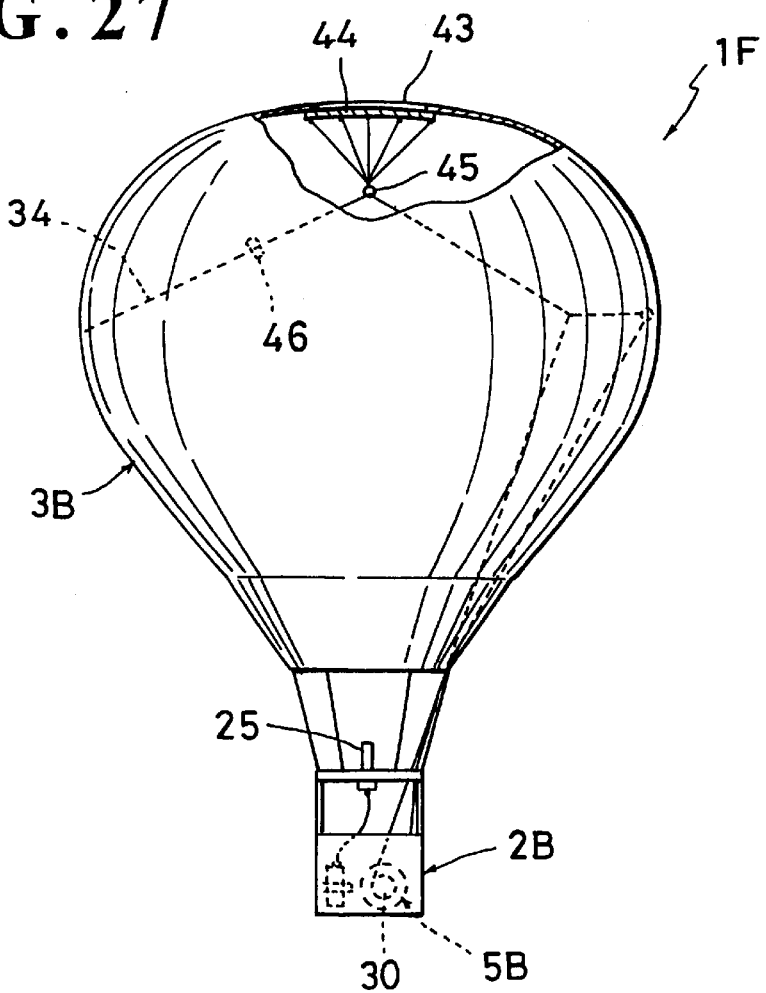
FIG. 27 is as side view, partly in-cross section, showing a seventh embodiment of the present invention.
Figure 28:
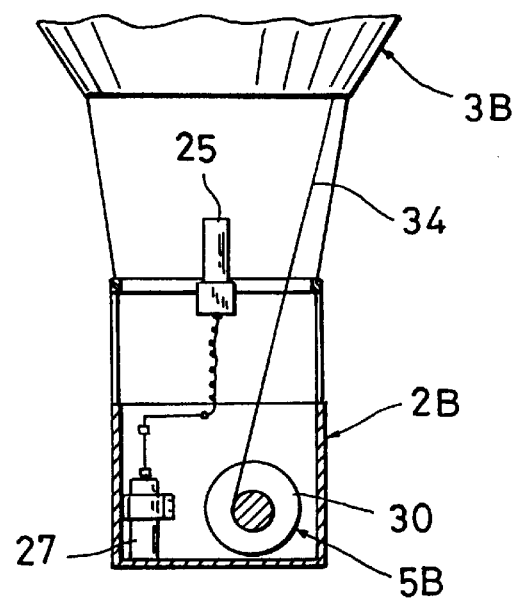
FIG. 28 is a longitudinal sectional view of a part of gondola showing a seventh embodiment of the present invention.

FIGS. 27 to 29 show a seventh embodiment of the present invention which is distinguished from the sixth embodiment by an ventilation machine 47 which is formed separately with the gondola 2B. An aircraft 1F according to the seventh embodiment have the lightweight-gondola 2B and will provide the same effects as the first embodiment.

As set forth above, the advantages of the pesent invention are as follows:

(1) Since an aircraft comprises a gondola capable of carrying customeres; an envelope installed to said gondola, storageble so as to roll up in an inside-out condition during a time of nonuse of said aircraft; and means for rolling continuously up said envelope in the inside-out condition with discharging a gas with in said envelope, the roll-up device for envelope installed within the gondola can roll up the envelope.

Therefore, storaging snd storing the envelope can be performed comfortably and easily.

(2) As depicted in the above paragraph (1), because the envelope is able to be rolled up to the roll-up device for the envelope with the expanded condition, storaging the envelope is perfomed comfortably and easily without the conventional work, such as extending of the envelope on the ground, and performed finely without the sticking soil and/or dust thereto.

(3) As depicted in the above paragraph (1), the envelope can be inflated without the extending on the ground because it is sent out from the roll-up device in order and supplied air and/or hot air.

Therefore, inflating the envelope can be performed comfortably and easily.

What is claimed is:

1. An aircraft comprising:
    a gondola having an interior compartment and an stowing aperture communicating said interior compartment to outside said gondola;
    an envelope for inflation with an inflation gas to effect lifting of said gondola, said envelope having an envelope mouth at a bottom thereof for introduction of said inflation gas;
    said envelope having detachable connectors for detachably connecting said envelope to said gondola with said envelope mouth aligned with said stowing aperture and said envelope having a stowing line attached to an inner surface thereof and extending into said stowing aperture; and
    an envelope roll-up mechanism mounted in said interior compartment and having a rotatable body with said stowing line connected thereto for drawing said envelope through said stowing aperture in an inside-out orientation and rolling up an entirety of said envelope after said detachable connectors are detached from said gondola.

2. An aircraft according to claim 1, wherein:
    said rotatable body is a drum; and
    said stowing line is connected to said inner surface at an upper part of said envelope.

3. An aircraft according to claim 1, wherein said interior compartment of said gondola provides a cabin for passengers.

4. An aircraft according to claim 1, wherein said gondola includes wheels for rolling on a ground surface to permit towing of said gondola.

5. An aircraft according to claim 1, wherein said gondola includes a self propulsion mechanism for effecting propulsion thereof on a ground surface.

6. An aircraft according to claim 1, wherein said envelope has a substantially spherical configuration when inflated.

7. An aircraft according to claim 1, wherein said envelope has a horizontally elongated configuration when inflated.

8. An aircraft according to claim 1, further comprising:
    a gas cylinder mounted to said gondola;
    a gas burner disposed on said gondola and aligned with said envelope mouth for burning a combustible gas supplied form said gas cylinder to heat said inflation gas in said envelope.

9. An aircraft according to claim 1, further comprising:
    a gas cylinder mounted to said gondola;
    a gas burner disposed on said gondola and aligned with said envelope mouth for burning a combustible gas supplied form said gas cylinder to heat said inflation gas in said envelope; and
    a ventilator mounted to said gondola for suppling said inflation gas to said envelope.

10. An aircraft for transporting passengers, comprising:
    a gondola having an interior compartment and an stowing aperture communicating said interior compartment to outside said gondola;
    an envelope for inflation with an inflation gas to effect lifting of said gondola, said envelope having an envelope mouth at a bottom thereof for introduction of said gas;
    said envelope being detachably connected to said gondola with said envelope mouth aligned with said stowing aperture and said envelope having first and second stowing lines attached respectively to first and second positions on opposing inner side surfaces of said envelope and extending into said stowing aperture at an angle with respect to each other; and
    an envelope roll-up mechanism mounted in said interior compartment and having first and second rotatable bodies with said first and second stowing lines connected respectively thereto for drawing said envelope through said stowing aperture in an inside-out orientation and rolling up said envelope.

11. The aircraft of claim 10 wherein said envelope is detachably connected to said gondola to permit said envelope to be rolled to a position entirely within said interior compartment when detached from said gondola.

12. An aircraft for transporting passengers, comprising:
    a gondola structure having an interior compartment and an stowing aperture communicating said interior compartment to outside said gondola structure;
    an envelope for inflation with an inflation gas to effect lifting of said gondola, said envelope having an envelope mouth at a bottom thereof for introduction of said gas;
    said envelope being connected to said gondola structure with said envelope mouth aligned with said stowing aperture and said envelope having a top portion and a stowing line attached to an inner surface at said top portion and extending into said stowing aperture;

an envelope roll-up mechanism having a rotatable body with said stowing line connected thereto for drawing said envelope through said stowing aperture in an inside-out orientation and rolling up said envelope after said detachable connectors are detached from said gondola;

a gas cylinder mounted to said gondola;

a gas burner disposed on said gondola and aligned with said envelope mouth for burning a combustible gas supplied form said gas cylinder to heat said inflation gas in said envelope; and a stowing line displacement mechanism including:
  a displacement line having a first end attached to said stowing line at a mid-portion thereof;

said envelope having an inner side surface with a connection means having said displacement line pass therethrough for permitting travel of said displacement line through said connection means; and said displacement line having a second end extending through said envelope mouth to permit displacement of said stowing line away from heat produced by said gas burner when tension is applied to said second end of said displacement line.

13. The aircraft of claim 12 wherein said envelope is detachably connected to said gondola to permit said envelope to be rolled to a position entirely within said interior compartment when detached from said gondola.

* * * * *